United States Patent
Van Kesteren et al.

[11] Patent Number: 5,952,094
[45] Date of Patent: Sep. 14, 1999

[54] MAGNETO-OPTICAL RECORDING MEDIUM

[75] Inventors: Hans W. Van Kesteren; Wouter B. Zeper; Friedrich J. A. Den Broeder; Johannes M. Kerkhof, all of Eindhoven, Netherlands

[73] Assignee: U.S. Philips Corporation, New York, N.Y.

[21] Appl. No.: 08/179,836

[22] Filed: Jan. 7, 1994

Related U.S. Application Data

[63] Continuation of application No. 07/925,358, Aug. 4, 1992, abandoned.

[30] Foreign Application Priority Data

Sep. 3, 1991 [EP] European Pat. Off. .............. 91202237

[51] Int. Cl.⁶ .................................................. G11B 5/66
[52] U.S. Cl. ................ 428/332; 428/336; 428/634 MM; 428/649 ML; 428/639 SC; 428/900; 369/13; 369/283; 369/286

[58] Field of Search ...................... 428/694 MM, 428/694 ML, 694 SC, 900, 332, 336; 363/13, 283, 286

[56] References Cited

FOREIGN PATENT DOCUMENTS

| 304873 | 3/1989 | European Pat. Off. . |
| 376375 | 7/1990 | European Pat. Off. . |
| 449252 | 10/1991 | European Pat. Off. . |
| 498089 | 8/1992 | European Pat. Off. . |
| 84358 | 5/1984 | Japan . |
| 171877 | 7/1988 | Japan . |

*Primary Examiner*—Leszek Kiliman

[57] ABSTRACT

The addition of Os or Re to the Co layers of a magneto-optical recording medium comprising a Co/X multilayer, where X=Pt, Pd, Au, Ni or Ru, results in a reduction of both the Curie temperature and the magnetization. By virtue thereof, the rewritability of the medium is improved and higher write frequencies can be employed.

10 Claims, 4 Drawing Sheets

MAGNETO-OPTICAL RECORDING MEDIUM

This is a continuation of application Ser. No. 07/925,358, filed Aug. 4, 1992 now abandoned.

BACKGROUND OF INVENTION

The invention relates to a magneto-optical recording medium comprising a substrate on which a magneto-optical recording layer is provided in the form of a multilayer having an easy axis of magnetization extending perpendicularly to the plane of the layer, said multilayer being composed of layers of a first type which contain predominantly Co and layers of a second type which contain a metal other than Co, said layers being alternately provided.

In a MO (=magneto-optical) recording medium data is represented by magnetized domains or bits. The direction of magnetization of the domains extends perpendicularly to the plane of the MO recording layer. The bits can be detected by means of the MO effect in which the direction of polarization of polarized light changes as a function of the direction of magnetization of the domains when said light is reflected (Kerr-effect) or passed (Faraday-effect).

The magnetized domains are obtained by locally heating the MO recording layer to a temperature above the Curie temperature of the material of the MO recording layer by means of a focused laser light beam. During cooling to a temperature below the Curie temperature, the magnetization is locally oriented according to the direction of an externally applied magnetic field and then frozen. This method is also termed thermomagnetic recording. A customary manner of inscribing information in a MO recording layer consists in rotating a disc-shaped recording medium while a permanent external magnetic field and a laser light beam which is modulated according to the information to be recorded inscribe magnetic domains in the MO recording layer. In this method the existing information has to be erased first before new information can be inscribed. A method of overwriting existing information with new information (termed direct overwrite) is magnetic field modulation (MFM). In MFM the external magnetic field is modulated according to the information to be recorded, the focused laser light beam used having a constant power. The external magnetic field is generated by a magnet coil.

A material which is customarily used for the MO recording layer is formed by alloys of rare earth transition metals such as GdTbFe and TbFeCo. Said materials have a number of disadvantages such as their sensitivity to oxidation and corrosion and their relative insensitivity to relatively short wavelengths of the laser light used. An alternative material for the MO recording layer which does not have the above disadvantages is a multilayer formed by alternating very thin layers of Co and Pt (or Pd).

Such an MO recording medium is described in European Patent Application EP-A-304873. The MO recording layer is composed of alternating layers of Co and Pt (or Pd). The Co layers have a thickness which ranges between 0.1 and 0.9 nm and the Pt layers have a thickness which ranges between 0.3 and 4 nm. The number of layers is selected such that the overall layer thickness of the MO recording layer is 5–80 nm.

Important properties for MO recording are, inter alia, the value of the magnetization and the Curie temperature of the MO recording layer. Said properties can be changed to a limited degree by varying the Pt layer thickness. Both the magnetization and the Curie temperature of the MO recording layer decrease according as the Pt layer thickness increases. The most favourable Carrier-to-Noise Ratio (CNR) is obtained, however, by using multilayers having relatively thin Pt layers, for example, of a thickness varying between 1.0 and 1.5 nm; a Co layer thickness of approximately 0.4 nm and an overall layer thickness of the recording layer of approximately 20 nm which corresponds to 14 Co/Pt layer combinations. However, such a multilayer simultaneously exhibits a relatively high magnetization and a high Curie temperature. Owing to said high Curie temperature the multilayer must be heated to a relatively high temperature during the recording process, which limits the possibility of rewriting. As a result of said high magnetization, high magnetic fields must be used during writing, which is disadvantageous, in particular, for writing using MFM having a high frequency (order of magnitude of 10 MHz). In the above-mentioned European Patent Application various elements are stated which can be added to the Co layer to reduce the Curie temperature of the MO recording layer. Examples of said elements are W, Nb, Ta and Mo. The addition of said elements to the Co layer has a number of disadvantages. Thus, already at low concentrations of said additives the nucleation field $H_n$ (in kA/m) becomes negative as a result of which the remanence is not 100% and, hence, the hysteresis loop is no longer square. The nucleation field $H_n$ is the magnetic field at which nucleation of a domain of opposite magnetization starts. A MO recording layer having a magnetic remanence below 100% exhibits a lower output (Kerr-effect) signal and, besides, additional noise (media noise). In addition, the magnetization may be disturbed by fields which are weaker than the coercive field $H_c$ (in kA/m), which fields may occur during inscribing a nearby domain.

It is an object of the invention to provide, inter alia, a MO recording medium in which the Curie temperature and the magnetization of the MO recording layer are reduced but in which the nucleation field $H_n$ remains positive and, hence, the hysteresis loop remains square. A reduction of the Curie temperature leads to an improved rewritability and a reduction of the magnetization enables the use of higher write frequencies.

According to the invention this object is achieved by a MO recording medium as described in the opening paragraph, which is charactexized in that the Co-containing layers comprise an element which is selected from the group formed by Os (osmium) and Re (rhenium). The addition of one of these elements to the Co layers leads to both a reduction of the Curie temperature and to a lower magnetization of the MO recording layer. In the case of an effective addition of said elements and at a customary overall multilayer thickness the influence on the nucleation field $H_n$ is small so that also the magnetic remanence remains 100%. The addition of elements to the Co layer does lead, however, to a lower Kerr rotation and, hence, also to a lower carrier level during reading so that an optimum must be found between the drawback of a lower carrier level and the advantages of a lower Curie temperature and a lower magnetization.

As noted above, the addition of elements such as W, Nb, Ta or Rh to the Co layer leads, depending on the concentration and the overall multilayer thickness, to a negative nucleation field $H_n$, while the reduction of the Curie temperature is small. Elements such as Ir, Ru and Mo yield a moderate reduction of the nucleation field but the effect on the Curie temperature is very small.

Only by using Os and Re a sufficient reduction of the Curie temperature and the magnetization are attained in combination with a very small reduction of the nucleation field $H_n$.

The optimum addition of Os or Re to the Co layers is governed by the overall multilayer thickness and is maximally 50 at. %. Higher concentrations lead to a negative nucleation field $H_n$. A suitable concentration is 3–8 at. % at an overall multilayer thickness of 20 nm.

Co/Pt multilayers can be prepared at room temperature by means of sputtering or by means of electron beam evaporation from separate Co and Pt evaporation sources. The addition of Os or Re takes place from a third sputter target or evaporation source. Alternatively, a sputter target can be used which consists of an alloy of Co and Os (or Re) thus producing layers consisting essentially of Co and Os (or Re), and of Pt.

The application of the above-mentioned invention is not limited to Co/Pt and Co/Pd multilayers as described in the above-mentioned EP-A-304873 but it can also be applied when Co/Au multilayers as described in EP-A-376375 are used and when Co/Ni multilayers as described in Netherlands Patent Application NL 9002840 are used, the last two Patent Applications being filed by Applicants, and the invention can also be applied when Co/Ru multilayers are used.

A metallic non-magnetic underlayer of, for example, Au, Pd or Pt may be applied between the substrate and the multilayer. The thickness of such an underlayer is, for example, 1–50 nm. By virtue of such an underlayer, in particular, $H_c$ is increased and, in addition, the perpendicular anisotropy of the multilayer is improved.

Exposure to the focused laser light beam is preferably carried out via the substrate. In this case, the substrate, which is mostly disc-shaped, must be transparent to the wavelength of the laser light used. In this manner, it is precluded that any dust particles or other impurities present on the surface of the substrate adversely affect the quality of recording and reading because said impurities are remote from the focal point of the objective used to focus the light beam on the multilayer. The transparent substrate is manufactured from, for example, glass, quartz or a transparent synthetic resin such as polycarbonate or polymethyl methacrylate. The surface of the substrate at the side of the multilayer may be provided with an optically scannable groove, a so-called servotrack or guide track, which is generally spiral-shaped. It is alternatively possible to use a replication process to provide the groove in a separate synthetic resin layer applied to the substrate, which layer consists of, for example, a UV light-cured layer of acrylates. The MO layer is applied on top of said layer. The outermost MO layer can be shielded from its surroundings by a protective layer of, for example, UV light-cured acrylate.

Inorganic dielectric layers, socalled tuning or enhancement layers, may be provided between the underlayer and the substrate and between the multilayer and the protective layer. Such layers increase the Kerr rotation. Examples of such dielectric layers are oxides such as $SiO_2$ and $TiO_2$, and nitrides such as AlN, AlSiN and $Si_3N_4$.

The linear velocity of the MO recording medium is governed by the type of information which is recorded, such as audio, video or data information and is, for example, 1 to 20 m/s. During recording, the exposed areas of the multilayer are heated to a temperature above or close to the Curie temperature, after which a magnetic domain or bit is formed in the multilayer by cooling, said domain or bit having a direction of magnetization which corresponds to the external magnetic field. Said external magnetic field originates from a magnet coil and is modulated in accordance with the information to be recorded with a frequency in the MHz range. The bits formed have small diametral dimensions of maximally one or a few micrometers so that a high information density is obtained.

The recorded information is read by using linearly polarized laser light having a low power and reading is based on the measurement of the Kerr-effect.

The invention will be explained in greater detail by means of exemplary embodiments and with reference to the accompanying drawings.

DESCRIPTION OF THE PREFERRED EMBODIMENT

Exemplary Embodiment 1

Figure 1:
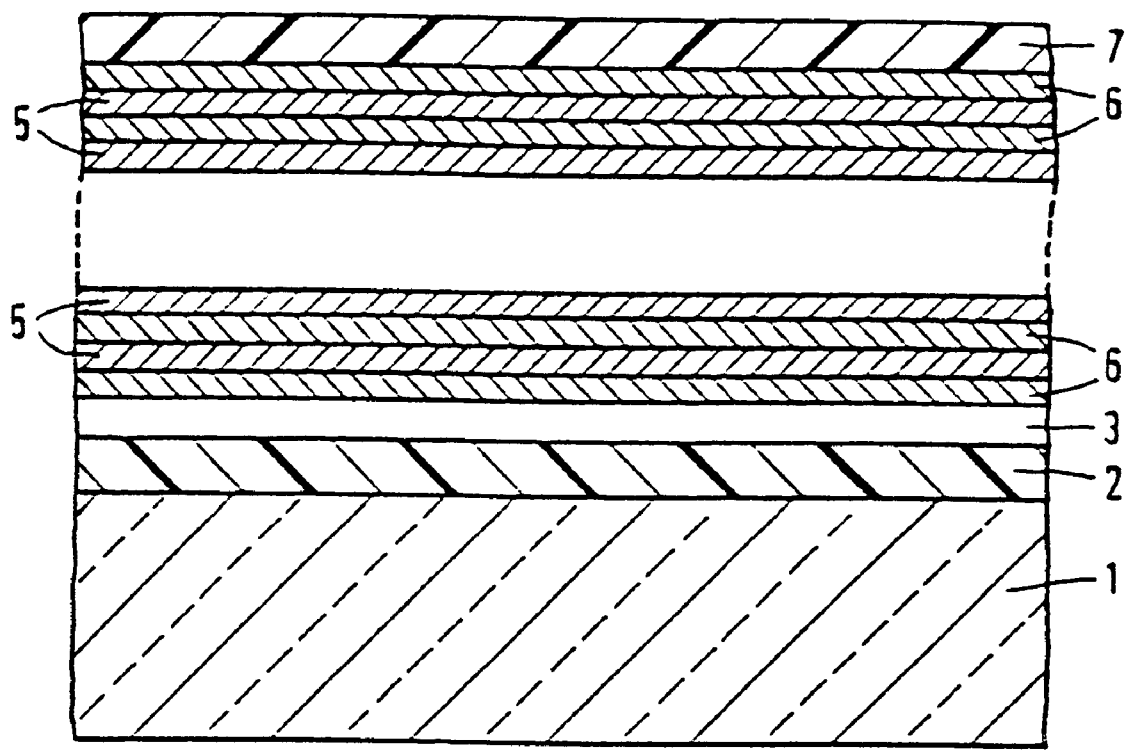
FIG. 1 is a diagrammatic sectional view of a part of a MO recording medium.

FIG. 1 is a diagrammatic sectional view of a part of a MO recording medium. Reference numeral 1 denotes a glass substrate having a diameter of 8.9 cm (3.5 inch) and a thickness of 1.2 mm. The surface of substrate 1 is provided with a layer 2 of a UV light-cured acrylate synthetic resin in which a spiral-shaped servotrack (not shown) is formed by a replication process which is known per se. A dielectric AlN layer 3 having a thickness of 80 nm is provided on layer 2 by sputtering. Electron beam evaporation is employed to provide the MO multilayer which consists of 14 Co layers 5 which are alloyed with Os and which are alternated with just as many Pt layers 6. The pressure in the evaporation device before and during evaporating is $4.10^{-8}$ and $5.10^{-7}$ mbar, respectively. The evaporation rate of the evaporation sources is kept constant at 0.1 nm/s by means of quartz-crystal controllers. The vapor flows are interrupted at pre-set intervals by mechanically driven shutters. Every Co layer 5 consists of 0.18 nm of Co, 0.015 nm of Os and 0.18 nm of Co, which corresponds to approximately 4 at. % of Os per Co layer. Thus, the layer thickness of each Co layer is 0.375 nm. The Pt layers 6 have a thickness of 1.0 nm. The overall multilayer thickness is approximately 20 nm. The multilayer is covered by a UV light-cured acrylate protective layer 7.

Figure 2:
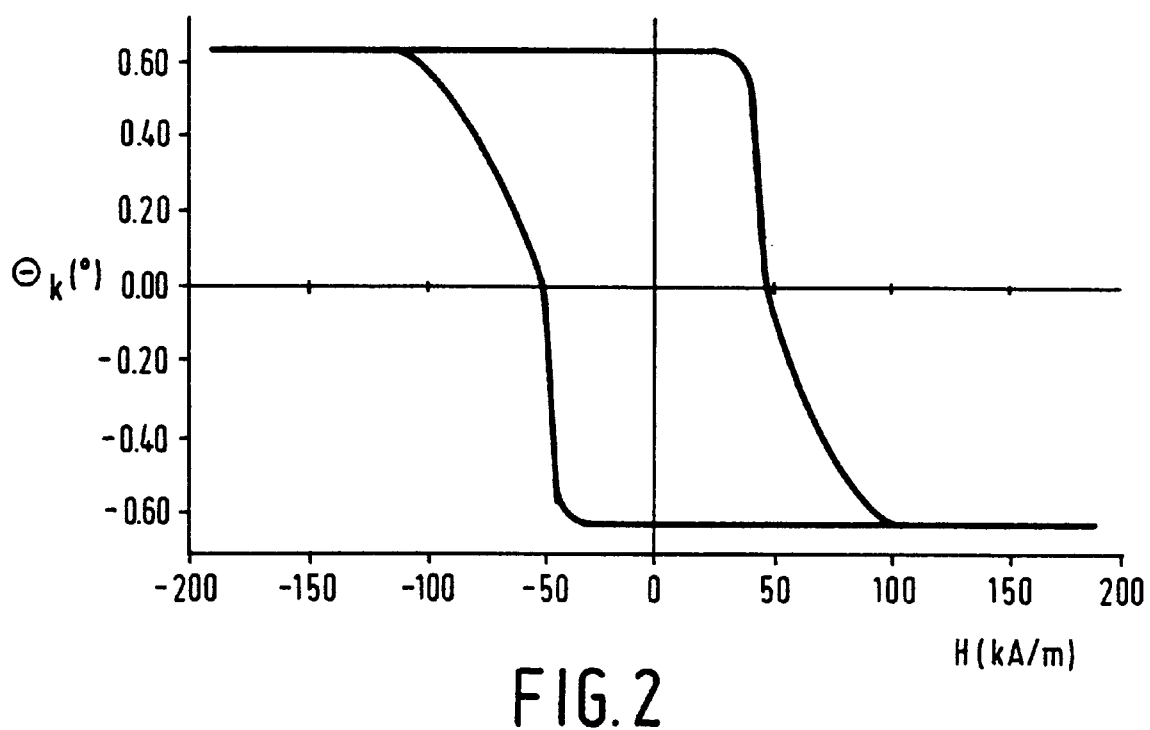
FIG. 2 shows the Kerr-rotation $\theta_k$ as a function of the applied magnetic field H, the Co layers containing 4 at. % of Os.

FIG. 2 shows the Kerr-rotation $\theta_k$ (in degrees) as a function of the applied magnetic field H (kA/m) measured at a wavelength of 820 nm. The Kerr-rotation is maximally 0.63°. The values of $H_c$ and $H_n$ are 48 and 40 kA/m, respectively. The remanence is 100%.

Comparative Example.

Figure 3:
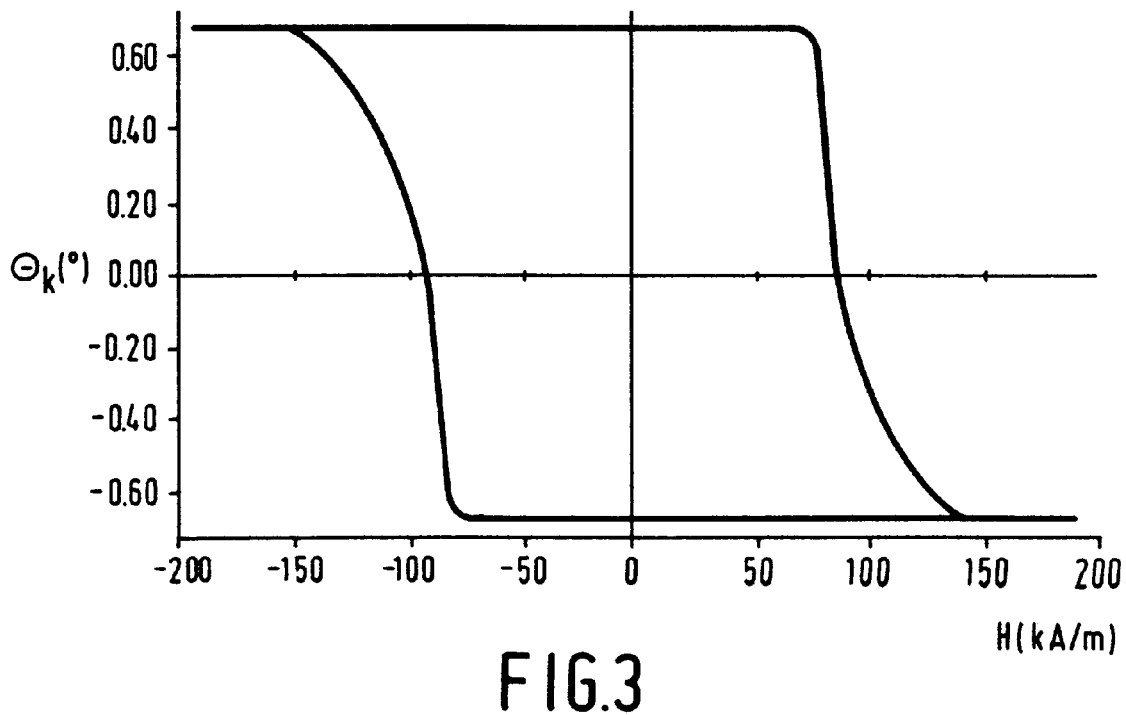
FIG. 3 shows the Kerr-rotation $\theta_k$ as a function of the applied magnetic field H, the Co layers not being alloyed.

A MO recording medium is manufactured in the same manner as described in exemplary embodiment 1, with this difference that no Os is added to the Co layers. FIG. 3 shows the $\theta_k$-H curve measured at a wavelength of 820 nm. The Kerr-rotation is maximally 0.68°. The values of $H_c$ and $H_n$ are 89 and 81 kA/m, respectively. Thus, the addition of Os brings about a very small decrease of the Kerr-effect (from 0.680 to 0.630).

The Table below gives the measuring results of a MO medium obtained in accordance with exemplary embodiment 1 and the comparative example, respectively. The media are inscribed at a linear disc rate of 5 m/s, a carrier frequency of 1 MHz and a laser pulse time of 400 ns. The media are read at a laser power of 0.9 mW. $P_{thr}$ is the minimum power required to inscribe domains in the medium. $P_s$ is the recording power at which the maximum CNR value is attained.

The addition of 4 at. % of Os to the Co layers of the multilayer brings about a lower value of $P_{thr}$ and $P_s$, as a result of which data can be recorded at a higher rate.

TABLE

| Medium | Co/Pt | (Co + 4 at. % Os)/Pt |
|---|---|---|
| $H_c$ (kA/m) | 89 | 48 |
| $H_n$ (kA/m) | 81 | 40 |
| $\theta_k$ (degrees) | 0,68 | 0,63 |
| $P_{thr}$ (mW) | 3,0 | 2,3 |
| $P_s$ (mW) | 8,7 | 5,7 |
| CNR (dB) | 53,7 | 49,6 |

Exemplary Embodiment 2.

Figure 4:
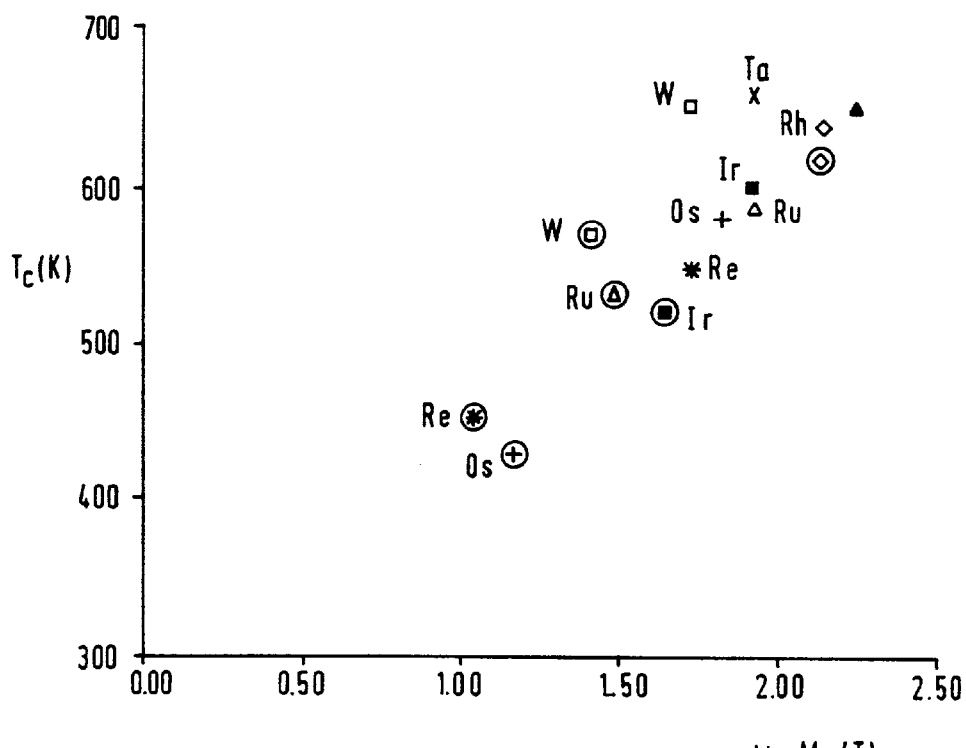
FIG. 4 shows the results of the Curie temperature $T_c$ and the magnetization $\mu_o M_s$ of Co/Pt multilayers in which the $C_o$ layers are not alloyed (▲) and in which the Co layers are alloyed with the indicated elements.

A multilayer consisting of 60 alternating layers of Co and Pt is evaporated on a substrate. The layer thickness of the Co layers is 0.35 nm; the layer thickness of the Pt layers is 1.3 nm. The overall multilayer thickness is 99 nm. Said relatively very thick multilayer is used for an accurate determination of the Curie temperature of the multilayer. Besides, samples are manufactured in which Ir, Os, Re, Ru, Rh, W. and Ta. are added to the Co layers in concentrations of approximately 8 and 19 at. %. The Curie temperature $T_c$ (in K) and the magnetization $\mu_o M_s$ (in T) of said samples is measured. The results are shown in FIG. 4. In FIG. 4 and subsequent Figures ▲ A means a sample without addition to the Co layers. The encircled symbols give the results of additions of 19 at. % to the Co layers; the symbols which are not encircled give the results of additions of 8 at. % to the Co layers. The Figure shows that the addition of Re and Os to the Co layers leads to a substantial decrease of the Curie temperature and the magnetization. The Figure shows a linear relation between $T_c$ and $\mu_o M_s$.

Figure 5:
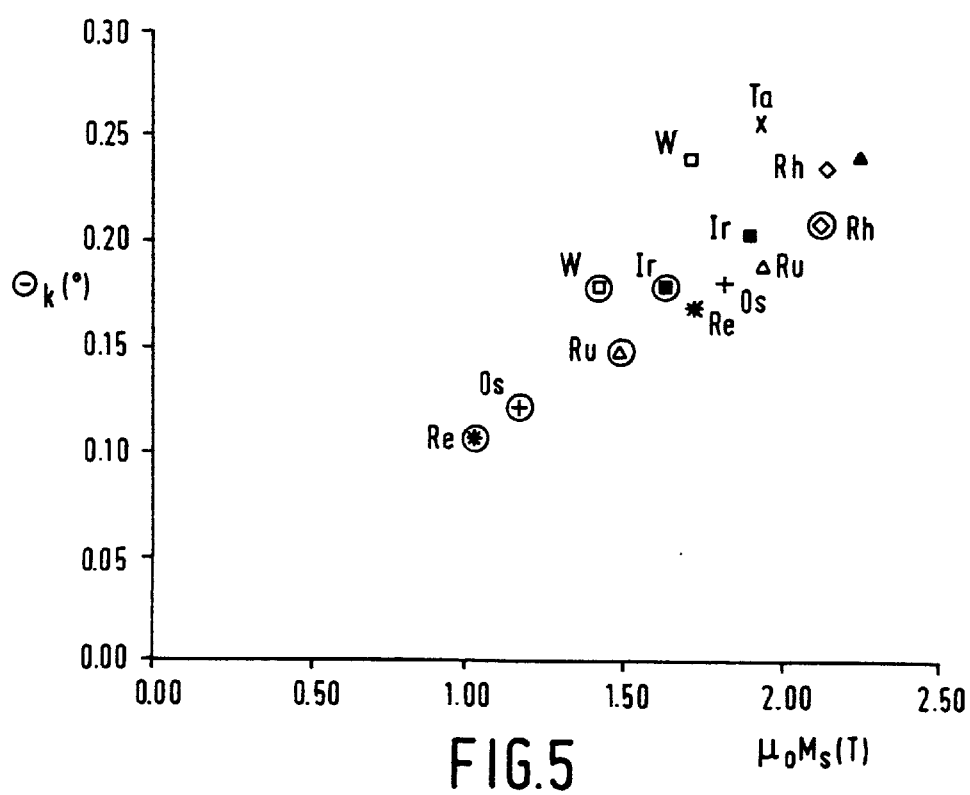
FIG. 5 shows the results of the Kerr-rotation $\theta_k$ and the magnetization $\mu_o M_s$ of Co/Pt multilayers in which the Co layers are not alloyed (▲) and in which the Co layers are alloyed with the indicated elements.

FIG. 5 shows the measuring results of the Kerr-rotation $\theta_k$ (in degrees) measured at 820 nm and the magnetization $\mu_o M_s$ (in T) of the same samples. The Figure shows a linear relation between $\theta_k$ and $\mu_o M_s$.

Figure 6:
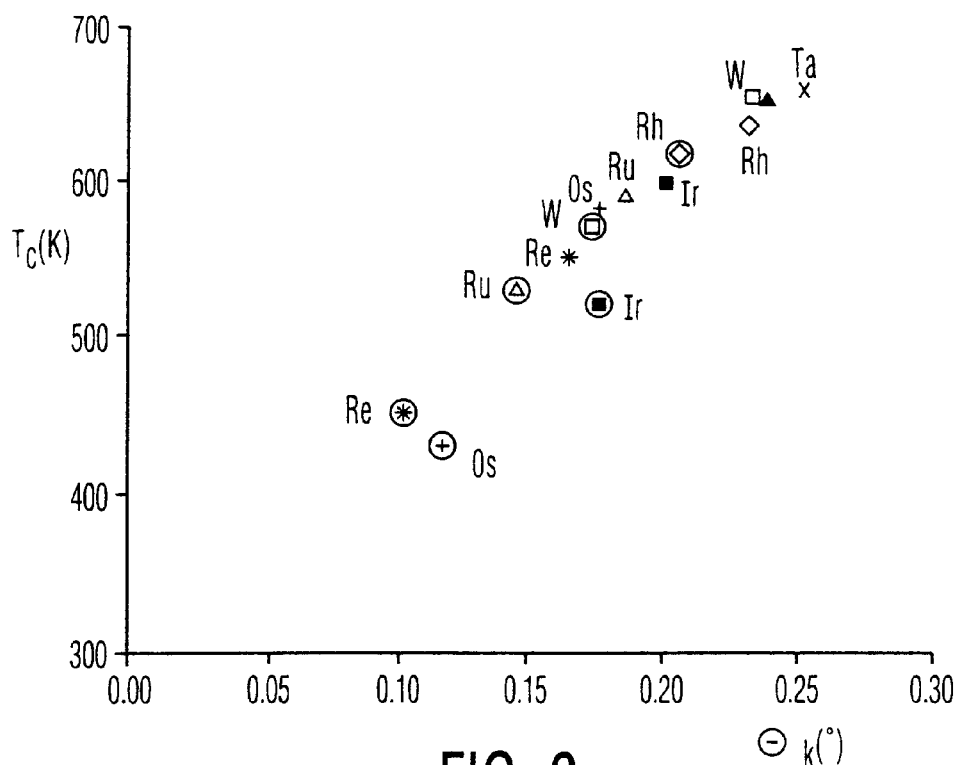
FIG. 6 shows the relation between the Curie temperature $T_c$ and the Kerr-rotation $\theta_k$ of Co/Pt multilayers in which the Co layers are not alloyed (▲) and in which the Co layers are alloyed with the indicated elements.

FIG. 6 shows the measuring results of the Curie temperature $T_c$ and the Kerr-rotation $\theta_k$ of the same samples. The Figure shows a linear relation between $T_c$ and $\theta_k$.

Figure 7:
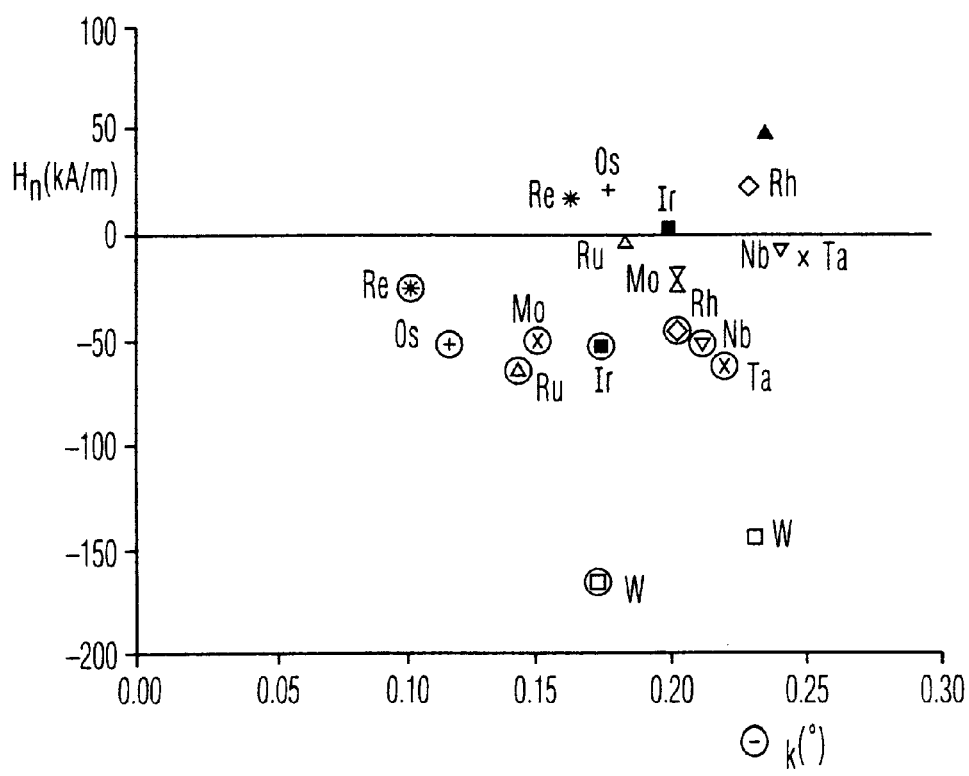
FIG. 7 shows the results of the nucleation field $H_n$ and the Kerr-rotation $\theta_k$ of Co/Pt multilayers in which the Co layers are not alloyed (▲) and in which the Co layers are alloyed with the indicated elements.

FIG. 7 shows the measuring results of the nucleation field $H_n$ (in kA/m) and the kerr-rotation $\theta_k$ (in degrees) measured at 820 nm of the same samples. Due to the above-mentioned linear relations the position along the horizontal axis is also a measure of both $T_c$ and $\mu_o M_s$. Elements on the right-hand side of the Figure such as Ta, Nb and W yield a small decrease of $T_c$ and $\mu_o M_s$. Elements on the left-hand side of the Figure (Os and Re) yield a substantial decrease of $T_c$ and $\mu_o M_s$. Elements such as Mo, Ru and Ir yield a moderate decrease of $T_c$ and $\mu_o M_s$. FIG. 7 shows that, at the selected multilayer thickness of 99 nm, the addition of 8 at. % of Os, Re, Ir or Rh yields a positive value of $H_n$ so that in these cases the magnetic remanence is 100%. The addition of Ru, Ta, Mo, Nb and W yields a negative value of $H_n$ causing the remanence to be below 100%. At the selected multilayer thickness of 99 nm, the addition of 19 at. % of all elements to the Co layer results each time in a negative value of $H_n$. However, at a customary multilayer thickness of 20 nm, Os and Re exhibit a positive value of $H_n$ at a concentration of 19 at. % in the Co layers. Although Rh yields a positive value of $H_n$, it appears from FIG. 4 that Rh has substantially no effect on the magnetization and yields a small decrease of the Curie temperature. Also Ir yields a value of $H_n$ which is only just positive but the effect on the Curie temperature is small. When the elements Os and Re are added to the Co layers a substantial decrease of both the Curie temperature $T_c$ and the magnetization $\mu_o M_s$ is obtained and, in addition, the value of the nucleation field $H_n$ remains positive at a customary multilayer thickness.

We claim:

1. A magneto-optical recording medium comprising a substrate and a magneto-optical recording multilayer having an easy axis of magnetization extending perpendicularly to the multilayer, said multilayer being composed of alternating first layers and second layers, said first layers consisting of an alloy comprising at least 3 at. % of an element selected from the group consisting of Os and Re, and at least 50 at. % cobalt, and said second layers comprising a metal other than cobalt, whereby said recording multilayer has a Curie point lower than a said recording multilayer in which said first layers consist of cobalt.

2. A medium as claimed in claim 1, characterized in that said first layers comprise 3–8 at. % of Os or Re, and said multilayer has a thickness of approximately 20 nm.

3. A medium as claimed in claim 2, characterized in that said second layers consist essentially of a metal selected from the group consisting of Pt, Pd, Au, Ni and Ru.

4. A medium as claimed in claim 1, characterized in that said second layers consist essentially of a metal selected from the group consisting of Pt, Pd, Au, Ni and Ru.

5. A magneto-optical recording medium comprising a substrate and a magneto-optical recording multilayer having an easy axis of magnetization extending perpendicularly to the multilayer, said multilayer being composed of alternating first layers and second layers, said first layers consisting essentially of cobalt and at least 3 at. % and at most 50 at. % of at least one element selected from the group consisting of Os and Re, and said second layers comprising a metal other than cobalt, whereby said recording layer has a Curie point lower than a said recording multilayer in which said first layers consist of cobalt.

6. A medium as claimed in claim 5, characterized in that said first layers consist essentially of cobalt and 3–8 at. % of said at least one element, and said multilayer has a thickness of approximately 20 nm.

7. A medium as claimed in claim 6, characterized in that said first layers consist essentially of cobalt and one element selected from the group consisting of Os and Re.

8. A medium as claimed in claim 7, characterized in that said second layers consist essentially of a metal selected from the group consisting of Pt, Pd, Au, Ni and Ru.

9. A magneto-optical recording medium comprising a substrate and a magneto-optical recording multilayer having an easy axis of magnetization extending perpendicularly to the multilayer, said multilayer being composed of alternating first layers and second layers, said first layers consisting essentially of an alloy of cobalt and at least 3 at. % and at most 50 at. % of at least one element selected from the group consisting of Os and Re, and said second layers consist essentially of a metal selected from the group consisting of Pt, Pd, Au, Ni and Ru, whereby said recording layer has a Curie point lower than a said recording multilayer in which said first layers consist of cobalt.

10. A medium as claimed in claim 9, characterized in that said alloy consists essentially of cobalt and 3–8 at. % of Os or Re, and said multilayer has a thickness of approximately 20 nm.

* * * * *